US008595417B2

(12) United States Patent
Lee (10) Patent No.: US 8,595,417 B2
(45) Date of Patent: Nov. 26, 2013

(54) MEMORY CONFIGURING METHOD, MEMORY CONTROLLER AND MEMORY STORAGE APPARATUS

(75) Inventor: Chien-Fu Lee, Yunlin County (TW)

(73) Assignee: Phison Electronics Corp., Miaoli (TW)

(*) Notice: Subject to any disclaimer, the term of this patent is extended or adjusted under 35 U.S.C. 154(b) by 305 days.

(21) Appl. No.: 13/113,101

(22) Filed: May 23, 2011

(65) Prior Publication Data

US 2012/0254512 A1 Oct. 4, 2012

(30) Foreign Application Priority Data

Mar. 28, 2011 (TW) .............................. 100110584 A (51) Int. Cl.
*G06F 12/00* (2006.01)
(52) U.S. Cl.
USPC .......................................... 711/103; 711/173
(58) Field of Classification Search
USPC ............................................ 711/103, 6, 173
See application file for complete search history.

(56) References Cited

U.S. PATENT DOCUMENTS

| 7,421,574 B2* | 9/2008 | Zhong ............................... 713/1 |
| 2009/0295827 A1* | 12/2009 | Mizuno ......................... 345/619 |
| 2011/0066761 A1* | 3/2011 | Ishibashi ........................... 710/5 |
| 2012/0160922 A1* | 6/2012 | Cau et al. ....................... 235/492 |

* cited by examiner

*Primary Examiner* — Reginald Bragdon
*Assistant Examiner* — Hannah A Faye-Joyner
(74) *Attorney, Agent, or Firm* — Jianq Chyun IP Office (57) ABSTRACT

A memory configuring method for a memory storage apparatus is provided, wherein a rewritable non-volatile memory module of the memory storage apparatus has a plurality of physical blocks. The method includes receiving a plurality of query commands from a host system, identifying a pattern corresponding to the query commands and recognizing a type of an operating system executed on the host system. The method further includes configuring the rewritable non-volatile memory module according to the type of the operating system and announcing a configuration of the memory storage apparatus to the host system. Accordingly, the method can configure the non-volatile memory module according different operating systems, and thereby the memory storage apparatus can successfully receive commands and re-set according to user's demand.

27 Claims, 8 Drawing Sheets

MEMORY CONFIGURING METHOD, MEMORY CONTROLLER AND MEMORY STORAGE APPARATUS

CROSS-REFERENCE TO RELATED APPLICATION

This application claims the priority benefit of Taiwan application serial no. 100110584, filed Mar. 28, 2011. The entirety of the above-mentioned patent application is hereby incorporated by reference herein and made a part of this specification.

BACKGROUND

1. Technology Field

The invention relates to a memory configuring method for configuring a rewritable non-volatile memory module, and a memory controller and a memory storage apparatus using the memory configuring method.

2. Description of Related Art

When an external storage apparatus is coupled to a host system through a connector (for example, a universal serial bus (USB)), an operating system (for example, a windows operating system Windows XP) of the host system may mount the external storage apparatus to a mount point, such that the operating system or a application program that is not built-in the operation system of the host system can access the external storage apparatus. Particularly, a tool application program developed by a manufacturer of the external storage apparatus is capable of transmitting a mass-storage devices support command (for example, a small computer system interface (SCSI) command) to the external storage apparatus via the mount point, so as to set the configurations of the external storage apparatus according to a user's demand. For example, a user may use the tool application program to set a storage attribute of a partition of the external storage apparatus to a write protect mode that forbids data to be written or a writable mode that allows data to be written.

However, because of security reasons, some types of the operating system may block an application program that is not built-in the operation system from transmitting the mass-storage devices support command to the external storage apparatus. For example, when the operating system of the host system is a MAC operating system or a Linux operating system, unless the user installs a specific driver for the connected external storage apparatus, the operating system does not allow the application program that is not built-in the operation system to directly transmit the mass-storage devices support command to the external storage apparatus via the mount point. For another example, in the Windows operating system, when the user logs in the operating system to use the host system through a limited user authorization mode (for example, a guest mode), the operating system blocks an application program that is not built-in the operation system from directly transmitting the mass-storage devices support command to the external storage apparatus via the mount point.

Therefore, if the specific driver of the storage apparatus is not installed in the MAC or Linux operating system, or in the windows operating system, the user uses the host system with the limited user authorization mode, the user cannot manage the external storage apparatus through the application program that is not built-in the operation system. For example, in case that the external storage apparatus is set to the write protect mode, the user cannot use the tool application program developed by the manufacturer of the external storage apparatus to reset the external storage apparatus to the writable mode. Therefore, it is inconvenient in utilization.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention is directed to a memory configuring method and a memory controller, which allows a user to set a memory storage apparatus by using an application program that is not built-in the operation system under various types of operating systems.

The invention provides a memory storage apparatus, which can be reset according to user's demand under various types of operating systems.

An exemplary embodiment of the invention provides a memory configuring method for a memory storage apparatus, wherein the memory storage apparatus has a rewritable non-volatile memory module, and the rewritable non-volatile memory module has a plurality of physical blocks. The memory configuring method includes receiving a plurality of query commands from a host system. The memory configuring method also includes identifying a pattern corresponding to the query commands and recognizing a type of an operating system of the host system according to the identified pattern. The memory configuring method further includes configuring the rewritable non-volatile memory module according to the type of the operating system and announcing a configuration of the memory storage apparatus to the host system.

An exemplary embodiment of the invention provides a memory controller for controlling a rewritable non-volatile memory module of a memory storage apparatus, wherein the rewritable non-volatile memory module has a plurality of physical blocks. The memory controller includes a host interface, a memory interface and a memory management circuit. The host interface is configured for coupling to a host system. The memory interface is configured for coupling to the rewritable non-volatile memory module. The memory management circuit is coupled to the host interface and the memory interface. The memory management circuit is configured to receive a plurality of query commands from the host system, and recognize a type of an operating system of the host system according to a pattern corresponding to the query commands. Moreover, the memory management circuit further configures the rewritable non-volatile memory module according to the type of the operating system and announces a configuration of the memory storage apparatus to the host system.

An exemplary embodiment of the invention provides a memory storage apparatus including a connector, a rewritable non-volatile memory module and a memory controller. The connector is configured for coupling to a host system, the rewritable non-volatile memory module has a plurality of physical blocks and the memory controller is coupled to the connector and the rewritable non-volatile memory module. The memory controller is configured to receive a plurality of query commands from the host system, and recognize a type of an operating system of the host system according to a pattern corresponding to the query commands. Moreover, the memory controller configures the rewritable non-volatile memory module according to the type of the operating system and announces a configuration of the memory storage apparatus to the host system.

Based on the above, the memory configuring method, the memory controller and the memory storage apparatus of exemplary embodiments are capable of configuring a rewritable non-volatile memory module according to different operating systems, so that the user may manage and set the memory storage apparatus under different operating systems.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Figure 1A:
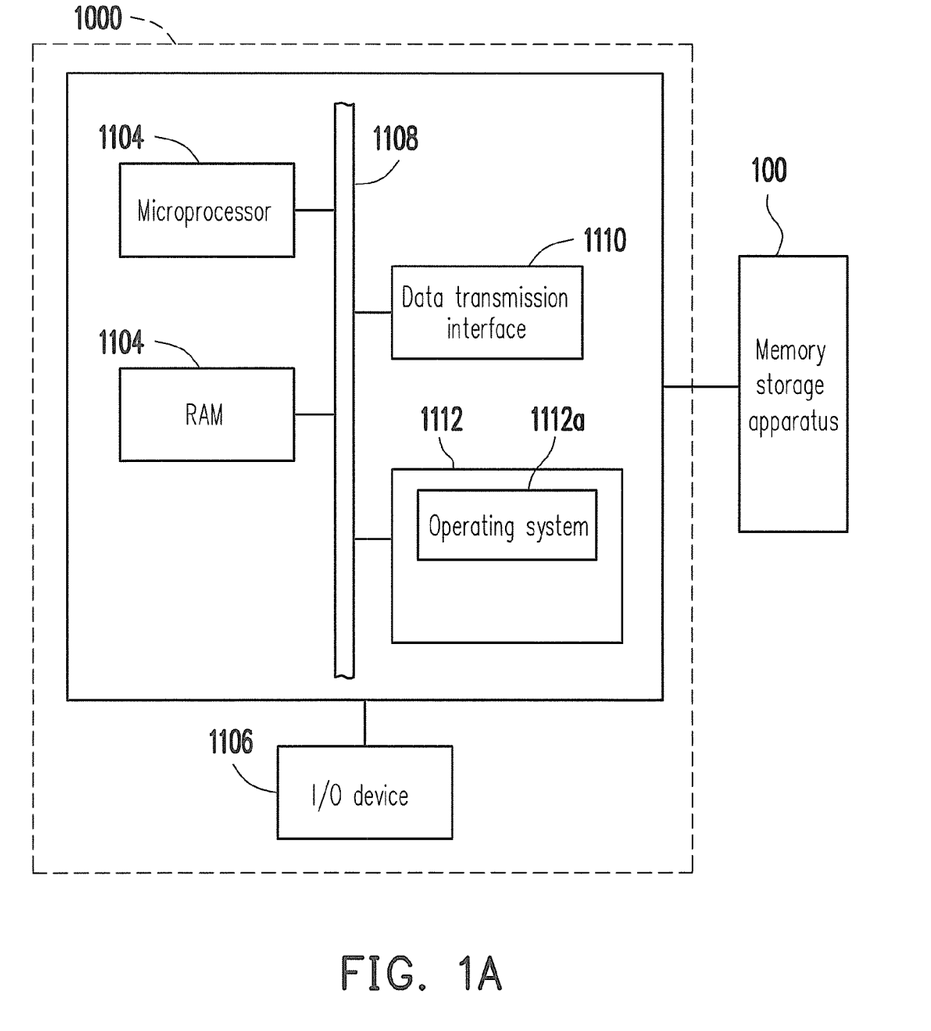
FIG. 1A is a schematic diagram of a memory storage apparatus and a host system according to an exemplary embodiment of the invention.

FIG. 1A is a schematic diagram of a host system using a storage apparatus according to an exemplary embodiment of the invention.

Figure 1B:
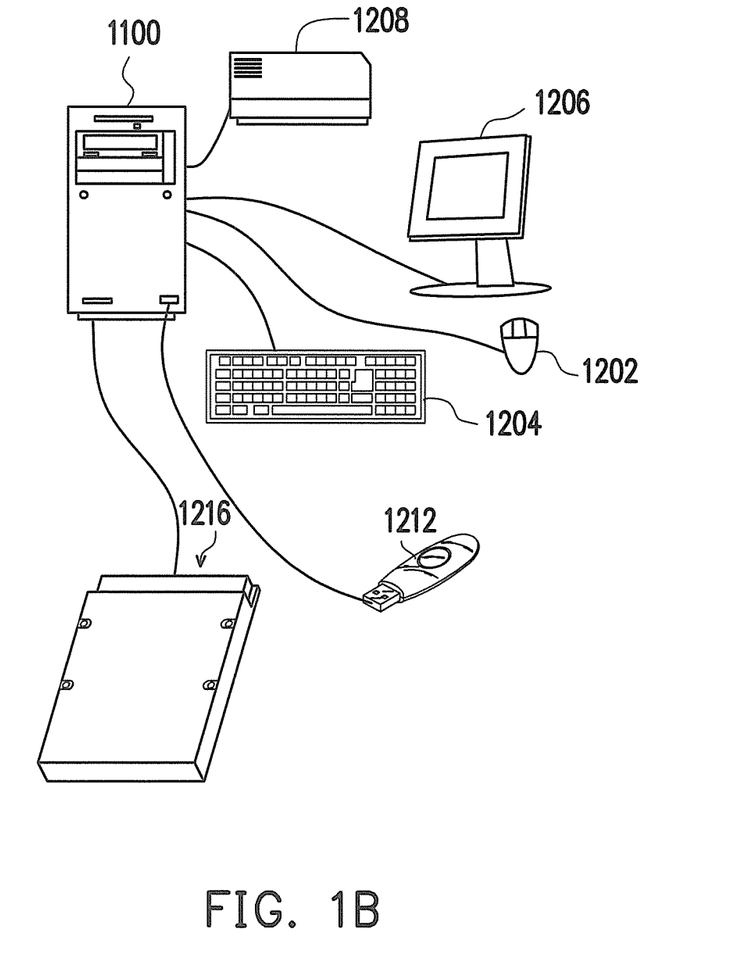
FIG. 1B is a schematic diagram illustrating a computer, input/output devices and memory storage apparatus according to an exemplary embodiment of the invention.

Referring to FIG. 1A, the host system 1000 generally includes a computer 1100 and an input/output (I/O) device 1106. The computer 1100 includes a microprocessor 1102, a random access memory (RAM) 1104, a system bus 1108, a data transmission interface 1110 and a built-in storage device 1112. The I/O device 1106 includes a mouse 1202, a keyboard 1204, a display 1206 and a printer 1208 shown in FIG. 1B. It should be noticed that the devices shown in FIG. 1B are not used to limit the I/O device 1106, and the I/O device 1106 may also include other devices.

In the present embodiment, the memory storage apparatus 100 is coupled to the other devices of the host system 1000 through the data transmission interface 1110. Based on operations of the microprocessor 1102, the RAM 1104, the I/O device 1106, and an operating system 1112a installed in the built-in storage device 1112, data can be written into the memory storage apparatus 100 or read from the memory storage apparatus 100.

Figure 2:
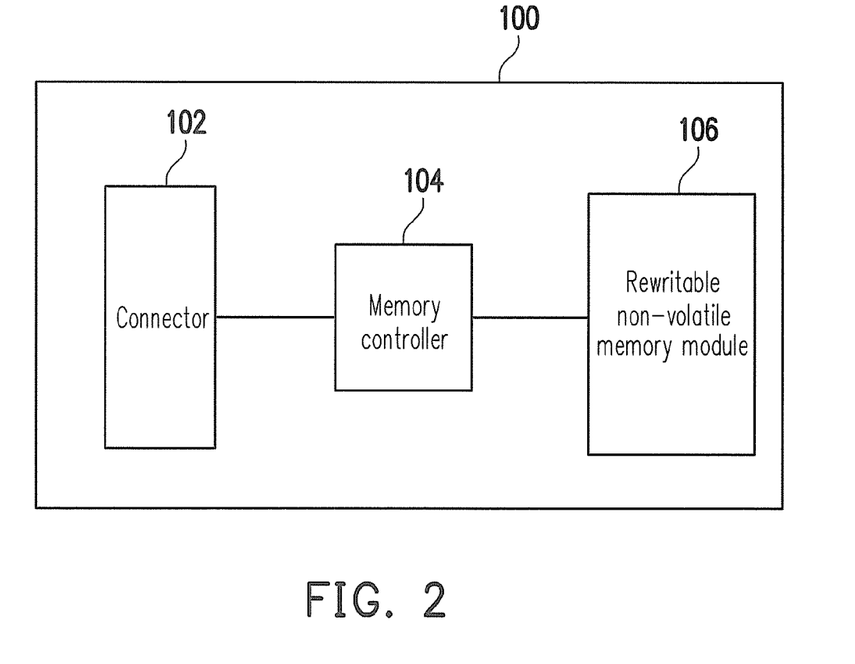
FIG. 2 is a schematic block diagram of a memory storage apparatus according to an exemplary embodiment of the invention.

FIG. 2 is a schematic block diagram of a memory storage apparatus according to an exemplary embodiment of the invention.

Referring to FIG. 2, in the present exemplary embodiment, the memory storage apparatus 100 is an external memory storage apparatus and is detachably coupled to the host system 1000. For example, the memory storage apparatus 100 is a flash drive 1212 or a solid state drive (SSD) 1216 shown in FIG. 1B. The memory storage apparatus 100 includes a connector 102, a memory controller 104 and a rewritable non-volatile memory module 106.

In the present exemplary embodiment, the connector 102 is, for example, a universal serial bus (USB) connector. However, it should be noticed that the invention is not limited thereto, and the connector 102 can also an institute of electrical and electronic engineers (IEEE) 1394 connector, a peripheral component interconnect express (PCI express) connector, a serial advanced technology attachment (SATA) connector, a secure digital (SD) interface connector, a memory stick (MS) interface connector, a multi media card (MMC) interface connector, a compact flash (CF) interface connector, an integrated drive electronics (IDE) interface connector or other suitable connectors.

The memory controller 104 may execute a plurality of logic gates or control commands implemented by hardware or firmware, and may perform a program operation, a read operation or an erase operation to the rewritable non-volatile memory module 106 according to operation commands of the host system 1000. Particularly, the memory controller 104 may configure the rewritable non-volatile memory module 106 according to a type of the operating system 1112a of the host system 1000 and announce a configuration of the memory storage apparatus 100 to the host system 1000. The methods for configuring the rewritable non-volatile memory module 106 and announcing the configuration of the memory storage apparatus 100 are described in detail below.

The rewritable non-volatile memory module 106 is coupled to the memory controller 104 and is used for storing data written by the host system 1000. In the present exemplary embodiment, the rewritable non-volatile memory module 106 is a multi level cell (MLC) NAND flash memory module. However, the invention is not limited thereto, and the rewritable non-volatile memory module 106 can also be a single level cell (SLC) NAND flash memory module, other flash memory modules or other memory modules having the same characteristic.

Figure 3:
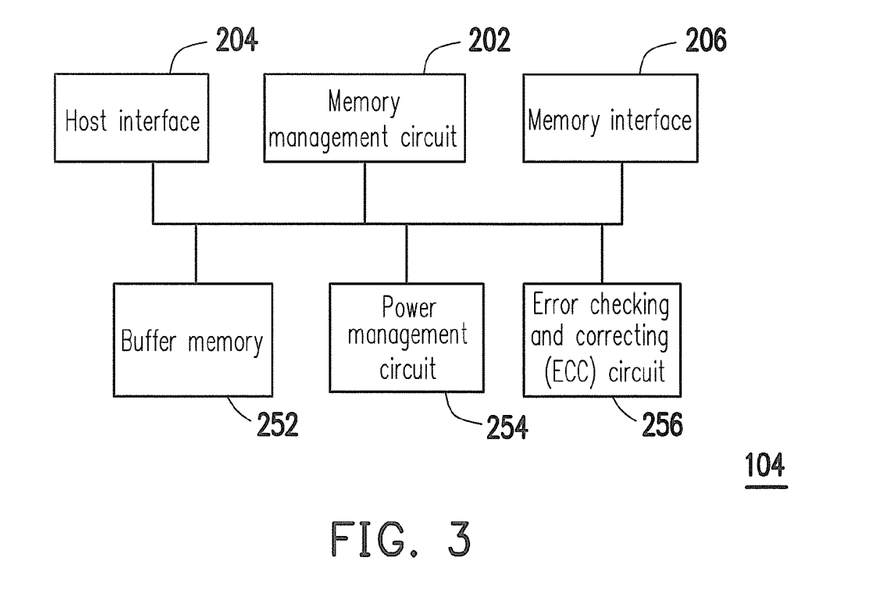
FIG. 3 is a schematic block diagram of a memory controller according to an exemplary embodiment of the invention.

FIG. 3 is a schematic block diagram of a memory controller according to an exemplary embodiment of the invention.

Referring to FIG. 3, the memory controller 104 includes a memory management circuit 202, a host interface 204 and a memory interface 206.

The memory management circuit 202 is configured for controlling a whole operation of the memory controller 104. In detail, the memory management circuit 202 has a plurality of control commands, and when the memory storage apparatus 100 operates, these control commands are executed to perform operations of writing, reading and erasing data in the rewritable non-volatile memory module 106.

In the present exemplary embodiment, the control commands of the memory management circuit 202 are implemented in a firmware form. For example, the memory management circuit 202 has a micro processing unit (not shown) and a read-only memory (not shown), and these control commands are burned in the read-only memory. When the memory storage apparatus 100 operates, these control commands are executed by the micro processing unit.

In another exemplary embodiment, the control commands of the memory management circuit 202 can also be stored in a specific address of the rewritable non-volatile memory module 106 in form of program codes. Moreover, the memory management circuit 202 has a micro processing unit (not shown), a read-only memory (not shown) and a random access memory (RAM) (not shown). Particularly, the read-only memory has a driver code, and when the memory controller 104 is enabled, the micro processing unit first executes the driver code to load the control commands stored in the rewritable non-volatile memory module 106 to the RAM of the memory management circuit 202. Then, the micro processing unit executes these control commands to perform data write, read and erase operations. Moreover, in another exemplary embodiment of the invention, the control commands of the memory management circuit 202 can also be implemented in a hardware form.

The host interface 204 is coupled to the memory management circuit 202, and is configured for receiving and recognizing commands and data transmitted by the host system 1000. Namely, the commands and data transmitted by the host system 1000 are transmitted to the memory management circuit 202 through the host interface 204. In the present exemplary embodiment, the host interface 204 is the USB interface. However, the present invention is not limited thereto, and the host interface 204 can also a parallel advanced technology attachment (PATA) interface, a SATA interface, an IEEE 1394 interface, a PCI express interface, a SD interface, a MS interface, a MMC interface, a CF interface, an IDE interface or other suitable data transmission interfaces.

The memory interface 206 is coupled to the memory management circuit 202 and is configured to access the rewritable non-volatile memory module 106. Namely, data to be written into the rewritable non-volatile memory module 106 is converted into a format that can be accepted by the rewritable non-volatile memory module 106 through the memory interface 206.

In an exemplary embodiment of the invention, the memory controller 104 further includes a buffer memory 252. The buffer memory 252 is coupled to the memory management circuit 202 and is configured to temporarily store system data and commands from the host system 1000 or data from the rewritable non-volatile memory module 106.

In an exemplary embodiment of the invention, the memory controller 104 further includes a power management circuit 254. The power management circuit 254 is coupled to the memory management circuit 202 and is configured to control the power of the memory storage apparatus 100.

In an exemplary embodiment of the invention, the memory controller 104 further includes an error checking and correcting (ECC) circuit 256. The ECC circuit 256 is coupled to the memory management circuit 202 and is configured to execute an error checking and correcting procedure to ensure data accuracy. In detail, when the memory management circuit 202 receives a write command from the host system 1000, the ECC circuit 256 generates a corresponding error checking and correcting code (ECC code) for data corresponding to the write command, and the memory management circuit 202 writes the data corresponding to the write command and the corresponding ECC code to the rewritable non-volatile memory module 106. Then, when the memory management circuit 202 reads data from the rewritable non-volatile memory module 106, it simultaneously reads the ECC code corresponding to the data, and the ECC circuit 256 executes the error checking and correcting procedure to the read data according to the ECC code.

Figure 4:
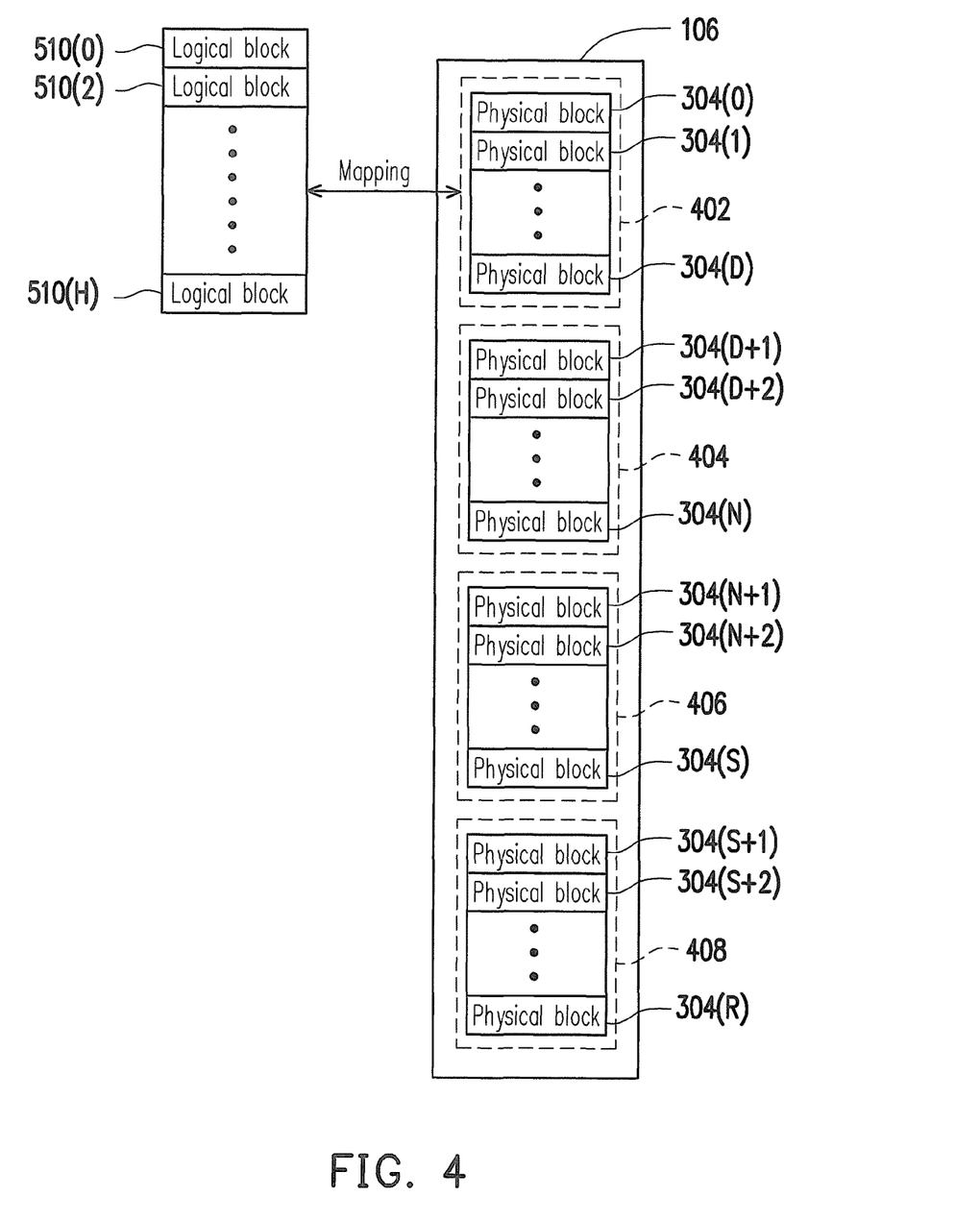
FIG. 4 is a schematic block diagram of managing a rewritable non-volatile memory module according to an exemplary embodiment of the invention.

FIG. 4 is a schematic block diagram of the rewritable non-volatile memory module according to an exemplary embodiment of the invention.

Referring to FIG. 4, the rewritable non-volatile memory module 106 has a plurality of physical blocks 304(0)-304(R). Each of the physical blocks has a plurality of physical pages, wherein the physical pages belonged to the same physical block may be independently written and must be simultaneously erased. In detail, physical block is the smallest unit for erasing data. Namely, each physical block contains the least number of memory cells that are erased all together. Physical page is the smallest unit for programming data. Namely, physical page is the smallest unit for writing data.

In the present exemplary embodiment, the memory management circuit 202 logically groups the physical blocks 304(0)-304(R) of the rewritable non-volatile memory module 106 into a data area 402, a free area 404, a system area 406 and a replacement area 408.

The physical blocks logically belonged to the data area 402 and the free area 404 are used to store data from the host system 1000. In detail, the physical blocks of the data area 402 (also referred to as "data physical blocks") are physical blocks already stored with data, and the physical blocks of the free area 404 (also referred to as "free physical blocks") are used for substituting the physical blocks in the data area 402 that have stored data. Therefore, the physical blocks in the free area 404 are empty or available physical blocks, i.e. physical blocks that are not stored with data or physical blocks stored with data marked to be invalid. Namely, the physical blocks in the free area 404 are already erased, or before the physical block in the free area 404 is selected to store data, an erase operation is first performed to the selected physical block. Therefore, the physical blocks of the free area 404 are available physical blocks.

The physical blocks logically belonged to the system area 406 (also referred to as "system physical blocks") are used for recording system data, wherein the system data includes manufacturer and a model number of the memory storage apparatus, the number of the physical blocks of the rewritable non-volatile memory module, and the number of physical pages in each physical block, etc.

The physical blocks logically belonged to the replacement area 408 (also referred to as "replacement physical blocks") are used to replace damaged physical blocks. For example, when the rewritable non-volatile memory module 106 is manufactured, a part of the physical blocks therein is preserved for replacement. Namely, when the physical blocks in the data area 402, the free area 404 and the system area 406 are damaged, the physical blocks preserved in the replacement area 408 are used to replace the damaged physical blocks (i.e. bad blocks). Thus, if there are still normal physical blocks in the replacement area 408 and a physical block is damaged, the memory management circuit 202 of the memory controller 104 selects a normal physical block from the replacement area 408 to replace the damaged physical block. If there is no more normal physical block in the replacement area 408 and a physical block is damaged, the memory management circuit 202 of the memory controller 104 announces that the memory storage apparatus 100 is at a write protect status and can not be used for writing data any more.

It should be noticed that during the operation of the memory storage apparatus 100, the physical blocks grouped into the data area 402, the free area 404, the system area 406, and the replacement area 408 are dynamically changed. For example, when a physical block in the free area 404 is damaged and replaced by a physical block selected from the replacement area 408, the physical block originally in the replacement area 408 is associated with the free area 404.

The memory management circuit 202 configures logical units 510(0)-510(H) to map the physical blocks of the data area 402, wherein each logical unit has a plurality of logical pages for sequentially mapping the physical pages of the corresponding data physical block. For example, when the memory storage apparatus 100 is formatted, the logical blocks 510(0)-510(H) are initially mapped to the physical blocks 304(0)-304(D) of the data area 402.

For example, the memory management circuit 202 maintains a logical block-physical block mapping table for recording mapping relationships between the logical blocks 510(0)-510(H) and the physical blocks of the data area 402. Moreover, since the host system 1000 accesses data in a unit of a logical access address (for example, a sector), when the host system 1000 accesses data, the memory management circuit 202 converts logical access addresses corresponding to the memory storage apparatus 100 into the corresponding logical pages. For example, when the host system 1000 is about to access a certain logical access address, the memory management circuit 202 converts the logical access address accessed by the host system 1000 into a multidimensional address formed by the corresponding logical block and logical page, and accesses data of the corresponding physical page according to the logical block-physical block mapping table.

In the present exemplary embodiment, the memory management circuit 202 may group a part of the logical blocks 510(0)-510(H) (for example, the logical blocks 510(0)-510(D)) into a first partition.

For example, the first partition is a general storage partition, and the host system 1000 may use the first partition to store data after passing through an identity authentication. In detail, when the memory storage apparatus 100 is coupled to the host system 1000, the memory management circuit 202 announces that the first partition 550 is a partition of a mass storage device to the host system 1000, and sets a storage attribute of the first partition 550 to a write protect mode (i.e. read-only). Particularly, when the user runs a tool application program (not shown) corresponding to the memory storage apparatus 100 on the host system 1000 and passes through the identity authentication, the memory management circuit 202 sets the storage attribute of the first partition 550 to a writable mode to allow the host system 1000 to write data thereon.

In the present exemplary embodiment, when the memory storage apparatus 100 is initially coupled to the host system 1000, the memory management circuit 202 recognizes the type of the operating system 1112a.

To be specific, when the memory storage apparatus 100 is initially coupled to the host system 1000, a handshaking procedure is performed between the host system 1000 and the memory storage apparatus 100, such that the operating system 1112a can recognize the memory storage apparatus 100. For example, the operating system 1112a may send a plurality of query commands, during Handshake Process or other task process, to obtain related information of the memory storage apparatus 100, so as to recognize and mount the memory storage apparatus 100. In the present exemplary embodiment, the memory management circuit 202 recognizes the type of the operating system 1112a according to a pattern of the query commands sent by the operating system 1112a.

For example, in the handshaking procedure, 5 query commands (i.e. query commands HQC1-HQC5) are used to recognize the memory storage apparatus 100. Particularly, different operating system platforms send the 5 query commands in different sequences. For example, a first operating system platform (for example, the MAC operating system) may sequentially send the handshaking query command HQC2, the handshaking query command HQC3, the handshaking query command HQC1, the handshaking query command HQC4 and the handshaking query command HQC5 to the memory storage apparatus 100 to recognize the memory storage apparatus 100. A second operating system platform (for example, the Linux operating system) may sequentially send the handshaking query command HQC2, the handshaking query command HQC3, the handshaking query command HQC4, the handshaking query command HQC1 and the handshaking query command HQC5 to the memory storage apparatus 100 to recognize the memory storage apparatus 100. A third operating system platform (for example, the Windows operating system) may sequentially send the handshaking query command HQC1, the handshaking query command HQC3, the handshaking query command HQC5, the handshaking query command HQC2 and the handshaking query command HQC4 to the memory storage apparatus 100 to recognize the memory storage apparatus 100.

For example, in the present exemplary embodiment, the patterns (i.e. transmitting sequences) of the query commands of various operating system platforms are recorded in an initial session table, and the initial session table is pre-stored in the memory storage apparatus 100. For example, the initial session table is stored in the physical block of the system area 406. In this way, when the memory storage apparatus 100 is initially coupled to the host system 1000, the memory management circuit 202 recognizes the type of the operating system 1112a according to the pattern of the query commands and the pattern information stored in the initial session table.

It should be noticed that although the type of the operating system is recognized according to the transmitting sequence of the query commands in the present exemplary embodiment, the present invention is not limited thereto, and other patterns of the query commands can also be used to recognize the type of the operating system.

Particularly, in the present exemplary embodiment, the memory management circuit 202 may configure the rewritable non-volatile memory module 106 according to the type of the operating system 1112a and announce a configuration of the memory storage apparatus 100 to the host system 1000. A plurality of exemplary embodiments is provided below to describe configurations and announcements corresponding to different operating system.

Figure 5:
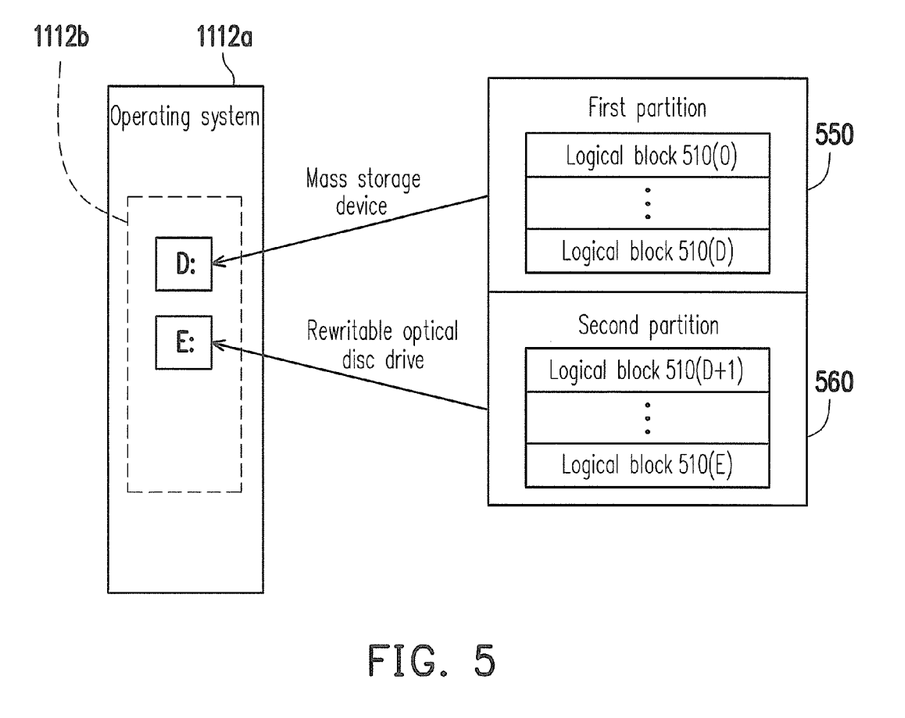
FIG. 5 is a schematic diagram of a configuration and an announcement corresponding to a first operating system according to an exemplary embodiment of the invention.

FIG. 5 is a schematic diagram of a configuration and an announcement corresponding to the first operating system according to an exemplary embodiment of the invention.

Referring to FIG. 5, when the operating system 1112a is the first operating system (for example, the MAC operating system) platform, the memory management circuit 202 groups another part of the logical blocks (for example, logical blocks 510(D+1)-510(E)) into a second partition 560, and simulates the second partition 560 as a rewritable optical disc partition, and announces that the memory storage apparatus 100 is an apparatus including a mass storage device and a rewritable optical disc drive to the host system 1000. In detail, when the memory storage apparatus 100 is coupled to the host system 1000, the operating system 1112a queries a device feature of the memory storage apparatus 100, and configures a mount point set 1112b according a response of the memory management circuit 202, wherein the first partition 550 belonged to the mass storage device is mounted to a mount point D of the mount point set 1112b and the second partition 560 belonged to the rewritable optical disc drive is mounted to a mount point E of the mount point set 1112b.

It should be noticed that although the second partition 560 is simulated as the rewritable optical disc partition in the present exemplary embodiment, the present invention is not limited thereto, and the second partition 560 can also be simulated as a partition of a rewritable digital video disc (DVD) or a rewritable blue-ray disc drive.

In the present exemplary embodiment, the tool application program installed in the operating system 1112a that corresponds to the memory storage apparatus 100 can transmit a mass-storage devices support command (for example, a small computer system interface (SCSI) command, or an IDE/ATA command) to the memory storage apparatus 100 through the mount point "E" corresponding to the rewritable optical disc drive, so as to set the memory storage apparatus 100 according to the user's demand.

For example, in case that a specific driver is not installed, when the user wants to change the storage attribute of the first partition 550 to the writable mode, after the user passes through the identity authentication, the tool application program can transmit a corresponding mass-storage devices support command to the memory storage apparatus 100 through the mount point "E" corresponding to the rewritable optical disc drive, and the memory management circuit 202 sets the storage attribute of the first partition 550 to the writable mode according to the mass-storage devices support command. To be specific, since the MAC operating system does not block a application program that is not built-in the operation system from directly transmitting the mass-storage devices support command to the rewritable optical disc drive through the mount point, the tool application program can successfully transmit the mass-storage devices support command. Then, as the storage attribute of the first partition 550 is set to the writable mode, data may be stored to the first partition 550 according to a built-in command (for example, a copy command or a paste command) of the operating system 1112a, or data stored in the first partition 550 may be updated according to the built-in command of the operating system 1112a. To be specific, when new data is written to the first partition 550 according to the built-in command of the operating system 1112a, the host system 1000 transmits a command complied with a mass storage device interface protocol to the memory storage apparatus 100, and the memory management circuit 202 writes the new data into the physical blocks mapped to the first partition 550 according to such command.

It should be noticed that although the memory management circuit 202 groups a part of the logical blocks as the second partition 560 in the exemplary embodiment of FIG. 5, the invention is not limited thereto. For example, the memory management circuit 202 can use a virtual partition to configure the second partition 560. In detail, when the virtual partition is used to configure the second partition 560, the second partition 560 is not mapped to any logical block and any physical block. Namely, the second partition 560 does not occupy memory space, so that it cannot be actually used for storing data.

Figure 6:
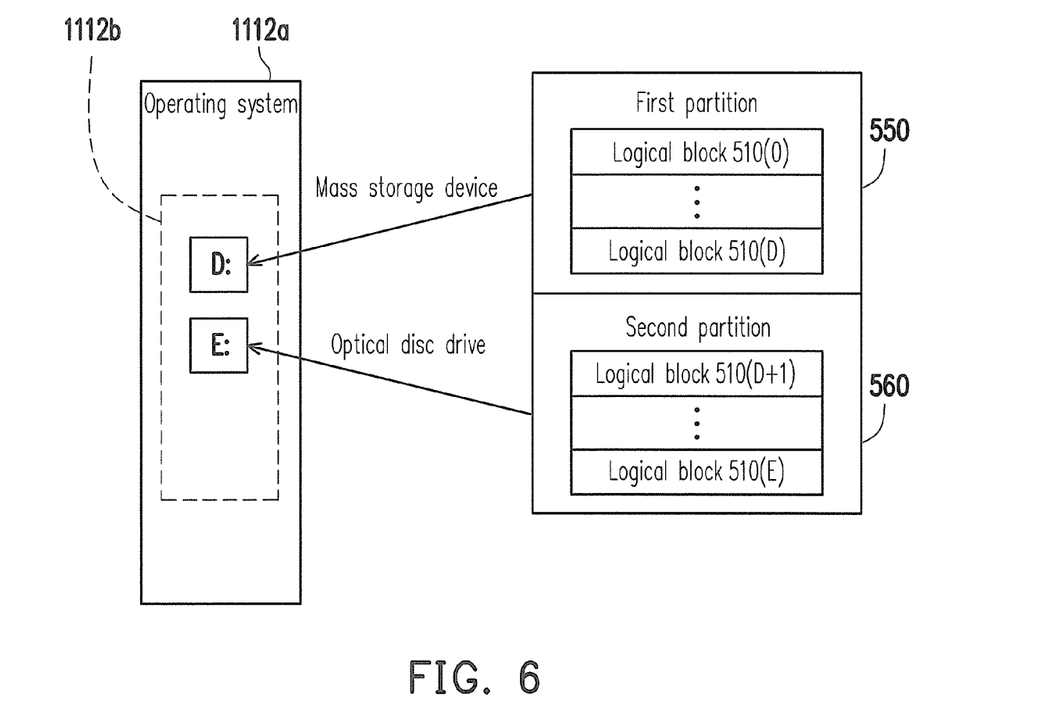
FIG. 6 is a schematic diagram of a configuration and an announcement corresponding to a second operating system according to an exemplary embodiment of the invention.

FIG. 6 is a schematic diagram of a configuration and an announcement corresponding to the second operating system according to an exemplary embodiment of the invention.

Referring to FIG. 6, when the operating system 1112a is the second operating system (for example, the Linux operating system) platform, the memory management circuit 202 groups another part of the logical blocks (for example, logical blocks 510(D+1)-510(E)) into the second partition 560, and simulates the second partition 560 as an optical disc partition, and announces that the memory storage apparatus 100 is an apparatus including a mass storage device and an optical disc drive to the host system 1000. In detail, when the memory storage apparatus 100 is coupled to the host system 1000, the operating system 1112a queries a device feature of the memory storage apparatus 100, and configures the mount point set 1112b according a response of the memory management circuit 202, wherein the first partition 550 belonged to the mass storage device is mounted to a mount point D of the mount point set 1112b and the second partition 560 belonged to the optical disc drive is mounted to a mount point E of the mount point set 1112b.

It should be noticed that although the second partition 560 is simulated as the optical disc partition in the present exemplary embodiment, the invention is not limited thereto, and the second partition 560 can also be simulated as a partition of a digital video disc (DVD) or a blue-ray disc drive.

In the present exemplary embodiment, the tool application program installed in the operating system 1112a that corresponds to the memory storage apparatus 100 can transmit a mass-storage devices support command (for example, s SCSI command, or an IDE/ATA command) to the memory storage apparatus 100 through the mount point "E" corresponding to the optical disc drive, so as to set the memory storage apparatus 100 according to the user's demand.

For example, in case that the specific driving program is not installed, when the user wants to change the storage attribute of the first partition 550 to the writable mode, after the user passes through the identity authentication, the tool application program can transmit a corresponding mass-storage devices support command to the memory storage apparatus 100 through the mount point "E" corresponding to the optical disc drive, and the memory management circuit 202 sets the storage attribute of the first partition 550 to the writable mode according to the mass-storage devices support command. In detail, since the Linux operating system does not block the application program that is not built-in the operation system from directly transmitting the mass-storage devices support command to the optical disc drive via the mount point, the tool application program can successfully transmit the mass-storage devices support command. Similarly, after the storage attribute of the first partition 550 is set to the writable mode, data may be stored to the first partition 550 according to a built-in command (for example, a copy command or a paste command) of the operating system 1112a, or data stored in the first partition 550 may be updated according to the built-in command of the operating system 1112a.

Figure 7:
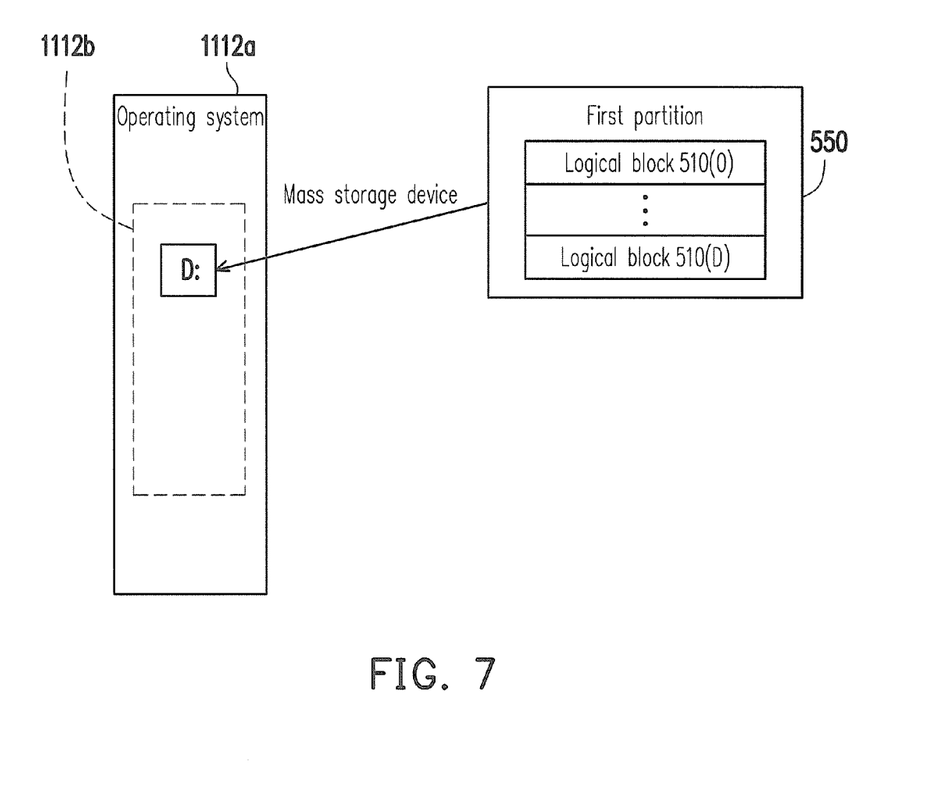
FIG. 7 is a schematic diagram of a configuration and an announcement corresponding to a third operating system according to an exemplary embodiment of the invention.

FIG. 7 is a schematic diagram of a configuration and an announcement corresponding to the third operating system according to an exemplary embodiment of the invention.

Referring to FIG. 7, when the operating system 1112a is the third operating system (for example, the Windows operating system) platform, the memory management circuit 202 announces that the memory storage apparatus 100 is a device including a human interface and a mass storage device. Herein, the device including the human interface and the mass storage device is also referred to as a composite device. In detail, when the memory storage apparatus 100 is coupled to the host system 1000, the operating system 1112a queries a device feature of the memory storage apparatus 100, and configures a human interface device (HID) path and the mount point set 1112b according a response of the memory management circuit 202, wherein the first partition 550 belonged to the mass storage device is mounted to the corresponding mount point. Herein, an interface of the mass storage device can be a SCSI interface, a PATA interface, a SATA interface or a USB interface, etc.

In the present exemplary embodiment, the tool application program installed in the operating system 1112a that corresponds to the memory storage apparatus 100 can use the HID path to transmit a command complied with a human interface protocol to the memory storage apparatus 100 through the mount point "D" corresponding to the first partition 550, so as to set the memory storage apparatus 100 according to the user's demand.

For example, when the user logging the operating system with limited authorization wants to change the storage attribute of the first partition 550 to the writable mode, after the user passes through the identity authentication, the tool application program can transmit a corresponding command to the memory storage apparatus 100 through the HID path, and the memory management circuit 202 sets the storage attribute of the first partition 550 to the writable mode according to the command. In the present exemplary embodiment, the HID path relates to a logical positioning method for HID, which is used to correctly transmit commands or data to the designated HID from the host system. In detail, when the user logs in the operating system 1112a to use the host system 1000 with a limited user authorization mode (for example, a guest mode of the Windows operating system), the operating system 1112a may block the application program that is not built-in the operation system from directly transmitting the mass-storage devices support command, for example, the SCSI command or the IDE/ATA command to the memory storage apparatus 100 through the mount point. Since the HID path is generally used for data transmission of an I/O device such as a keyboard or a mouse, etc., the operating system 1112a does not block the data transmitted through the HID path under the limited user authorization mode. Similarly, after the storage attribute of the first partition 550 is set to the writable mode, data may be stored to the first partition 550 according to a built-in command of the operating system 1112a, or data stored in the first partition 550 may be updated according to the built-in command of the operating system 1112a.

It should be noticed that in the exemplary embodiments of FIG. 5, FIG. 6 and FIG. 7, the tool application program corresponding to the memory storage apparatus 100 is installed to the operating system 1112a through network download or a compact disc. However, the invention is not limited thereto, and in another exemplary embodiment, the memory management circuit 202 can further group another part of the logical blocks (for example, logical blocks 510(E+1)-510(F)) into a third partition, and stores the tool application program into the physical blocks mapped to the third partition. Particularly, similar as that described above, the memory management circuit 202 may initially set a storage attribute of the third partition to the write protect mode to avoid mistakenly deleting the tool application program. In this way, the user can execute the tool application program stored in the third partition on the operating system 1112a of the host system 1000 to manage and set the memory storage apparatus 100.

Figure 8:
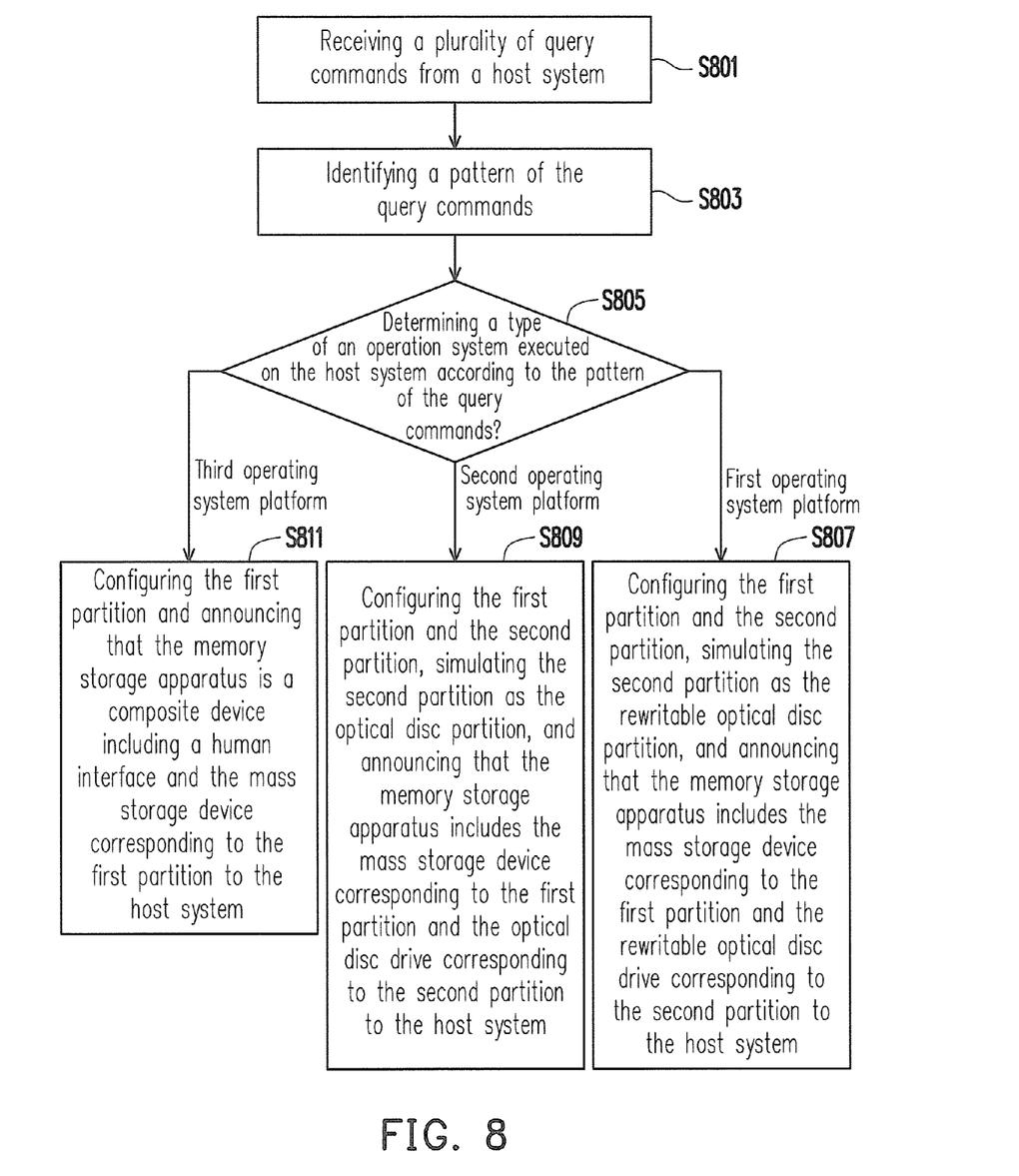
FIG. 8 is a flowchart illustrating a memory configuring method according to an exemplary embodiment of the invention.

FIG. 8 is a flowchart illustrating a memory configuring method according to an exemplary embodiment of the invention.

Referring to FIG. 8, when the memory storage apparatus 100 is coupled to the host system 1000, in step S801, the memory management circuit 202 receives a plurality of query commands from the host system 1000. As described above, the host system 1000 sends the query commands to the memory storage apparatus 100 to perform the handshaking procedure.

In step S803, the memory management circuit 202 identifies a pattern of the query commands. Moreover, in step S805, the memory management circuit 202 determines a type of the operating system 1112a executed on the host system 1000 according to the pattern of the query commands. For example, the memory management circuit 202 recognizes a transmitting sequence of the query commands transmitted by the operating system 1112a, and recognizes an operating system platform corresponding to the transmitting sequence according to the initial session table, so as to recognize the type of the operating system 1112a.

When the operating system 1112a of the host system 1000 is the first operating system (for example, the MAC operating system), in step S807, the memory management circuit 202 configures the first partition 550 and the second partition 560, and simulates the second partition 560 as the rewritable optical disc partition, and announces that the memory storage apparatus 100 is an apparatus including the mass storage device corresponding to the first partition 550 and the rewritable optical disc drive corresponding to the second partition 560 to the host system 1000.

When the operating system 1112a of the host system 1000 is the second operating system (for example, the Linux operating system), in step S809, the memory management circuit 202 configures the first partition 550 and the second partition 560, and simulates the second partition 560 as the optical disc partition, and announces that the memory storage apparatus 100 is an apparatus including the mass storage device corresponding to the first partition 550 and the optical disc drive corresponding to the second partition 560 to the host system 1000.

When the operating system 1112a of the host system 1000 is the third operating system (for example, the Windows operating system), in step S811, the memory management circuit 202 configures the first partition 550 and announces that the memory storage apparatus 100 is a composite device including a human interface and the mass storage device corresponding to the first partition 550 to the host system 1000.

Then, the tool application program corresponding to the memory storage apparatus 100 may use a corresponding method to transmit a mass-storage devices support command or a HID command to set the memory storage apparatus 100 (for example, change the storage attribute of the first partition) according to the configuration of the rewritable non-volatile memory module 106.

In summary, the memory configuring method, the memory controller and the memory storage apparatus using the same of the invention can recognize the type of the operating system of the host system, and correspondingly configure the rewritable non-volatile memory module. In this way, the user can set the memory storage apparatus through the application program that is not built-in the operation system under various operating systems. The previously described exemplary embodiments of the present invention have the advantages aforementioned, wherein the advantages aforementioned not required in all versions of the present invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A memory configuring method for a memory storage apparatus, wherein the memory storage apparatus has a rewritable non-volatile memory module and the rewritable non-volatile memory module has a plurality of physical blocks, the memory configuring method comprising:
   receiving a plurality of query commands from a host system;
   identifying a pattern corresponding to the query commands and recognizing a type of an operating system of the host system according to the pattern; and
   configuring the rewritable non-volatile memory module according to the type of the operating system and announcing a configuration of the memory storage apparatus to the host system.

2. The memory configuring method as claimed in claim 1, wherein the step of identifying the pattern corresponding to the query commands and recognizing the type of the operating system of the host system according to the pattern comprises:
   identifying a transmitting sequence of the query commands and recognizing the type of the operating system of the host system according to the transmitting sequence.

3. The memory configuring method as claimed in claim 1, further comprising:
   configuring a first partition and a second partition on the memory storage apparatus,
   wherein the step of configuring the rewritable non-volatile memory module according to the type of the operating system and announcing the configuration of the memory storage apparatus to the host system comprises:
   when the operating system of the host system is a first operating system platform, simulating the second partition as a rewritable optical disc partition and announcing that the memory storage apparatus is an apparatus comprising a mass storage device and a rewritable optical disc drive to the host system,
   wherein the mass storage device corresponds to the first partition and the rewritable optical disc drive corresponds to the second partition.

4. The memory configuring method as claimed in claim 3, wherein the second partition is a virtual partition without occupying memory space.

5. The memory configuring method as claimed in claim 3, further comprising:
   receiving a mass-storage devices support command from a mount point and setting a storage attribute of the first partition to a writable mode according to the mass-storage devices support command,
   wherein the host system mounts the rewritable optical disc drive to the mount point.

6. The memory configuring method as claimed in claim 1, further comprising:
   configuring a first partition and a second partition on the memory storage apparatus,
   wherein the step of configuring the rewritable non-volatile memory module according to the type of the operating system and announcing the configuration of the memory storage apparatus to the host system comprises:
   when the operating system of the host system is a second operating system platform, simulating the second partition as an optical disc partition and announcing that the memory storage apparatus is an apparatus comprising a mass storage device and an optical disc drive to the host system,
   wherein the mass storage device corresponds to the first partition and the optical disc drive corresponds to the second partition.

7. The memory configuring method as claimed in claim 6, further comprising:
   receiving a mass-storage devices support command from a mount point and setting a storage attribute of the first partition to a writable mode according to the mass-storage devices support command,
   wherein the host system mounts the optical disc drive to the mount point.

8. The memory configuring method as claimed in claim 1, further comprising:
   configuring a first partition on the memory storage apparatus,
   wherein the step of configuring the rewritable non-volatile memory module according to the type of the operating system and announcing the configuration of the memory storage apparatus to the host system comprises:
   announcing that the memory storage apparatus is a composite device comprising a human interface and a mass storage device to the host system when the operating system of the host system is a third operating system platform,
   wherein the mass storage device corresponds to the first partition.

9. The memory configuring method as claimed in claim 8, further comprising:
   receiving a command complied with a human interface protocol through a human interface device path of the host system and setting a storage attribute of the first partition to a writable mode according to the command.

10. A memory controller for controlling a rewritable non-volatile memory module of a memory storage apparatus, wherein the rewritable non-volatile memory module has a plurality of physical blocks, and the memory controller comprising:
- a host interface, configured to couple to a host system;
- a memory interface, configured to couple to the rewritable non-volatile memory module; and
- a memory management circuit, coupled to the host interface and the memory interface,
- wherein the memory management circuit is configured to receive a plurality of query commands from the host system, and recognize a type of an operating system of the host system according to a pattern corresponding to the query commands,
- wherein the memory management circuit configures the rewritable non-volatile memory module according to the type of the operating system and announces a configuration of the memory storage apparatus to the host system.

11. The memory controller as claimed in claim 10, wherein the memory management circuit identifies a transmitting sequence of the query commands and recognizes the type of the operating system of the host system according to the transmitting sequence.

12. The memory controller as claimed in claim 10, wherein the memory management circuit configures a first partition and a second partition,
- wherein when the operating system of the host system is a first operating system platform, the memory management circuit simulates the second partition as a rewritable optical disc partition and announces that the memory storage apparatus is an apparatus comprising a mass storage device and a rewritable optical disc drive to the host system,
- wherein the mass storage device corresponds to the first partition and the rewritable optical disc drive corresponds to the second partition.

13. The memory controller as claimed in claim 12, wherein the second partition is a virtual partition without occupying memory space.

14. The memory controller as claimed in claim 12, wherein the host system mounts the rewritable optical disc drive to a mount point,
- wherein the memory management circuit receives a mass-storage devices support command from the mount point and sets a storage attribute of the first partition to a writable mode according to the mass-storage devices support command.

15. The memory controller as claimed in claim 10, wherein the memory management circuit configures a first partition and a second partition,
- wherein when the operating system of the host system is a second operating system platform, the memory management circuit simulates the second partition as an optical disc partition and announces that the memory storage apparatus is an apparatus comprising a mass storage device and an optical disc drive to the host system,
- wherein the mass storage device corresponds to the first partition and the optical disc drive corresponds to the second partition.

16. The memory controller as claimed in claim 15, wherein the host system mounts the optical disc drive to the mount point,
- wherein the memory management circuit receives a mass-storage devices support command from the mount point and sets a storage attribute of the first partition to a writable mode according to the mass-storage devices support command.

17. The memory controller as claimed in claim 10, wherein the memory management circuit configures a first partition,
- wherein when the operating system of the host system is a third operating system platform, the memory management circuit announces that the memory storage apparatus is a composite device comprising a human interface and a mass storage device to the host system,
- wherein the mass storage device corresponds to the first partition.

18. The memory controller as claimed in claim 17, wherein the memory management circuit receives a command complied with a human interface protocol through a human interface device path of the host system and sets a storage attribute of the first partition to a writable mode according to the command.

19. A memory storage apparatus, comprising:
- a connector, configured to couple to a host system;
- a rewritable non-volatile memory module, having a plurality of physical blocks; and
- a memory controller, coupled to the connector and the rewritable non-volatile memory module,
- wherein the memory controller is configured to receive a plurality of query commands from the host system and recognize a type of an operating system of the host system according to a pattern corresponding to the query commands,
- wherein the memory controller configures the rewritable non-volatile memory module according to the type of the operating system and announces a configuration of the memory storage apparatus to the host system.

20. The memory storage apparatus as claimed in claim 19, wherein the memory controller identifies a transmitting sequence of the query commands and recognizes the type of the operating system of the host system according to the transmitting sequence.

21. The memory storage apparatus as claimed in claim 19, wherein the memory controller configures a first partition and a second partition,
- wherein when the operating system of the host system is a first operating system platform, the memory controller simulates the second partition as a rewritable optical disc partition and announces that the memory storage apparatus is an apparatus comprising a mass storage device and a rewritable optical disc drive to the host system,
- wherein the mass storage device corresponds to the first partition and the rewritable optical disc drive corresponds to the second partition.

22. The memory storage apparatus as claimed in claim 21, wherein the second partition is a virtual partition without occupying a memory space.

23. The memory storage apparatus as claimed in claim 19, wherein the host system mounts the rewritable optical disc drive to a mount point,
- wherein the memory controller receives a mass-storage devices support command from the mount point and sets a storage attribute of the first partition to a writable mode according to the mass-storage devices support command.

24. The memory storage apparatus as claimed in claim 19, wherein the memory controller configures a first partition and a second partition,
- wherein when the operating system of the host system is a second operating system platform, the memory controller simulates the second partition as an optical disc partition and announces that the memory storage apparatus is an apparatus comprising a mass storage device and an optical disc drive to the host system, wherein the mass storage device corresponds to the first partition and the optical disc drive corresponds to the second partition.

25. The memory storage apparatus as claimed in claim 24, wherein the host system mounts the optical disc drive to the mount point, wherein the memory controller receives a mass-storage devices support command from the mount point and sets a storage attribute of the first partition to a writable mode according to the mass-storage devices support command.

26. The memory storage apparatus as claimed in claim 19, wherein the memory controller configures a first partition, wherein when the operating system of the host system is a third operating system platform, the memory controller announces that the memory storage apparatus is a composite device comprising a human interface and a mass storage device to the host system, wherein the mass storage device corresponds to the first partition.

27. The memory storage apparatus as claimed in claim 26, wherein the memory controller receives a command complied with a human interface protocol through a human interface device path of the host system and sets a storage attribute of the first partition to a writable mode according to the command.

* * * * *